United States Patent
Hicks, III

(10) Patent No.: US 8,711,738 B2
(45) Date of Patent: *Apr. 29, 2014

(54) METHODS, SYSTEMS, AND COMPUTER-READABLE MEDIA FOR PROVIDING AN EVENT ALERT

(75) Inventor: John Alson Hicks, III, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,868

(22) Filed: Sep. 14, 2012

(65) Prior Publication Data

US 2013/0009776 A1 Jan. 10, 2013

Related U.S. Application Data

(63) Continuation of application No. 11/848,325, filed on Aug. 31, 2007, now Pat. No. 8,331,268.

(51) Int. Cl.
*H04L 12/16* (2006.01)
*H04M 1/725* (2006.01)
*H04M 19/04* (2006.01)

(52) U.S. Cl.
CPC ........ *H04M 1/72597* (2013.01); *H04M 19/041* (2013.01); *H04M 19/047* (2013.01)
USPC ..................... 370/271; 379/373.02

(58) Field of Classification Search
CPC .......... H04M 1/72597; H04M 19/041; H04M 19/047
See application file for complete search history.

(56) References Cited

U.S. PATENT DOCUMENTS

| 6,678,359 | B1 | 1/2004 | Gallick | |
|---|---|---|---|---|
| 7,012,999 | B2 | 3/2006 | Ruckart | |
| 7,454,009 | B2* | 11/2008 | Aupperle et al. | 379/373.02 |
| 7,616,741 | B2* | 11/2009 | Reynolds et al. | 379/88.17 |
| 7,734,033 | B2* | 6/2010 | Aupperle et al. | 379/373.02 |
| 2004/0213401 | A1* | 10/2004 | Aupperle et al. | 379/372 |
| 2004/0234061 | A1* | 11/2004 | Koch et al. | 379/207.02 |
| 2005/0258938 | A1* | 11/2005 | Moulson | 340/7.58 |
| 2006/0040646 | A1* | 2/2006 | Moody et al. | 455/412.2 |
| 2006/0111085 | A1* | 5/2006 | Lee | 455/412.2 |
| 2006/0245560 | A1 | 11/2006 | Jeng | |
| 2007/0025530 | A1 | 2/2007 | Tidwell et al. | |

(Continued)

OTHER PUBLICATIONS

U.S. Office Action dated Mar. 29, 2011 in U.S. Appl. No. 11/848,325.

(Continued)

*Primary Examiner* — Hassan Phillips
*Assistant Examiner* — Ajay Cattungal
(74) *Attorney, Agent, or Firm* — Hartman & Citrin LLC

(57) ABSTRACT

Methods, systems, and computer-readable media provide for providing an event alert. According to embodiments, a method for providing an event alert is provided. According to the method, an incoming communication from a first device is detected. An initiating party associated with the first device is identified. Whether the initiating party associated with the first device is further associated with an alert tag is determined. The alert tag may include an identifying alert identifying the initiating party associated with the first device. In response to determining that the initiating party associated with the first device is associated with the alert tag, the identifying alert is provided as the event alert on a second device.

20 Claims, 7 Drawing Sheets

(56) References Cited

U.S. PATENT DOCUMENTS

| | | |
|---|---|---|
| 2007/0047523 A1* | 3/2007 | Jiang .............................. 370/352 |
| 2007/0053335 A1 | 3/2007 | Onyon et al. |
| 2007/0072594 A1 | 3/2007 | Caspi et al. |
| 2007/0073848 A1 | 3/2007 | Fratti |
| 2007/0204042 A1* | 8/2007 | Noble ............................ 709/225 |
| 2007/0293211 A1* | 12/2007 | Yang et al. .................... 455/420 |
| 2008/0082421 A1* | 4/2008 | Onyon et al. ................... 705/14 |
| 2009/0041220 A1* | 2/2009 | Aupperle et al. ........ 379/207.16 |

OTHER PUBLICATIONS

U.S. Notice of Allowance dated Jun. 21, 2012 in U.S. Appl. No. 11/848,325.

* cited by examiner

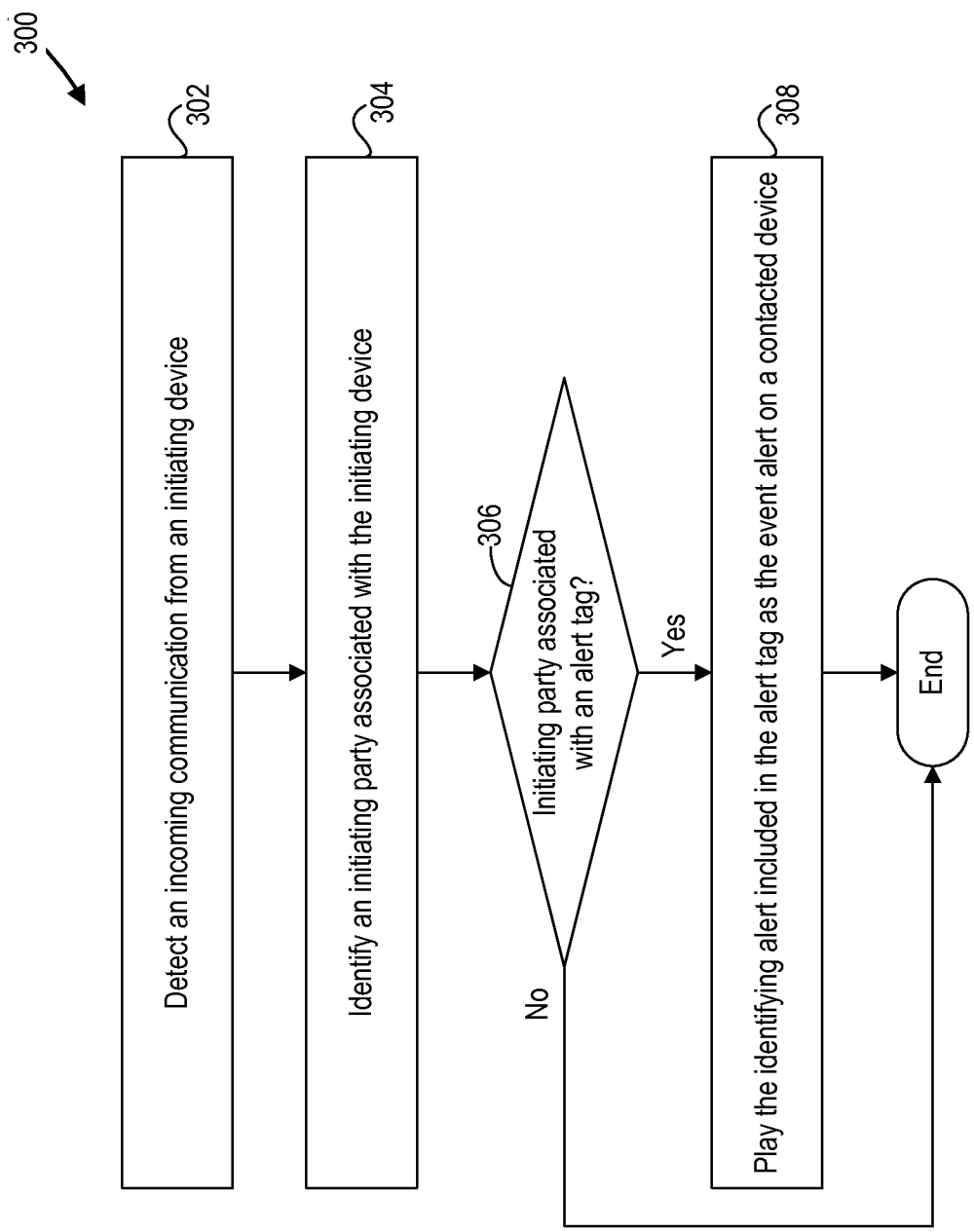

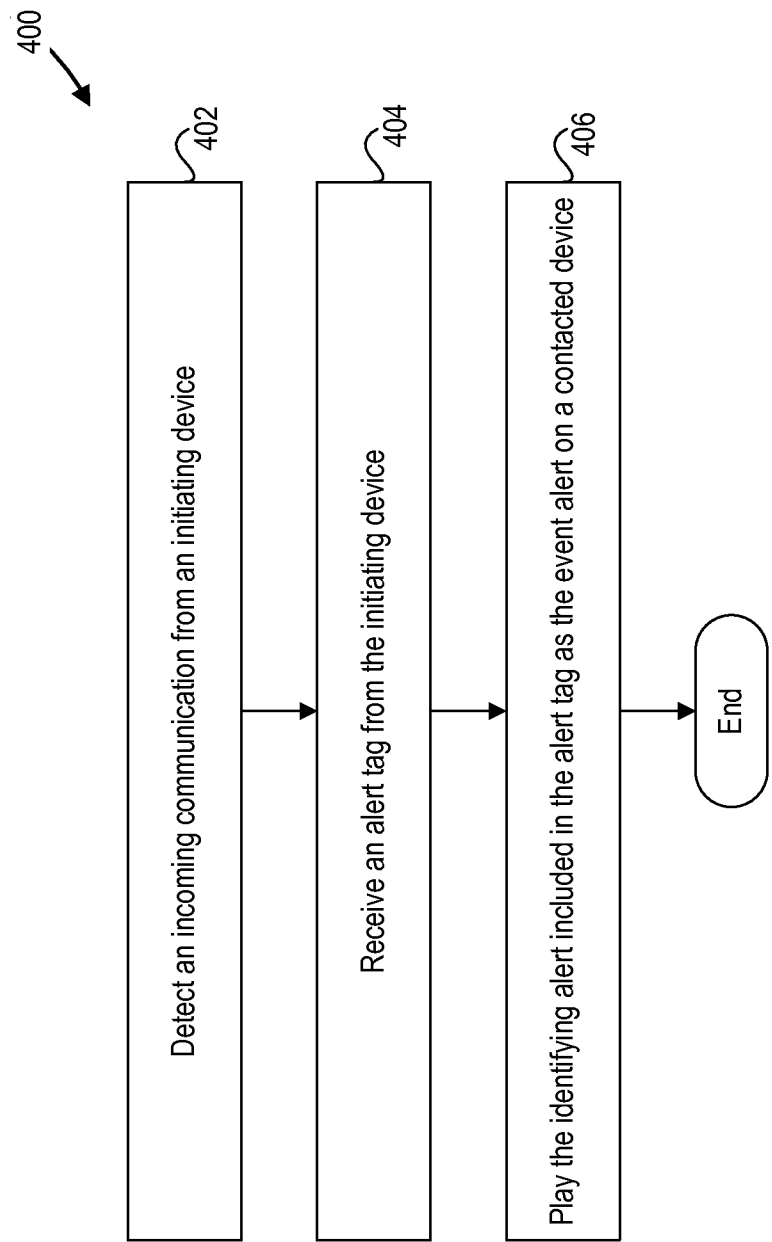

METHODS, SYSTEMS, AND COMPUTER-READABLE MEDIA FOR PROVIDING AN EVENT ALERT

CROSS REFERENCE TO RELATED APPLICATIONS

This application is a continuation of U.S. application Ser. No. 11/848,325 entitled "Methods, Systems, and Computer-Readable Media for Providing an Event Alert" filed Aug. 31, 2007, and issued as U.S. Pat. No. 8,331,268, which is expressly incorporated in its entirety herein by reference.

TECHNICAL FIELD

This application relates generally to the field of communications-based alerts. More specifically, the disclosure provided herein relates to the field of event alerts.

BACKGROUND

Alerts are commonly added to a variety of mechanical and electrical devices to alert a user of an occurrence of a particular event. In one example, conventional telephones typically provide a ringing sound or vibration which indicates an incoming call. In another example, a conventional electronic mail ("email") client may provide a simple tone sequence indicating the arrival of a new email. However, these conventional alerts provide only a limited amount of information to the user.

SUMMARY

Embodiments of the disclosure presented herein include methods, systems, and computer-readable media for providing an event alert. According to one aspect, a method for providing an event alert is provided. According to the method, an incoming communication from a first device is detected. An initiating party associated with the first device is identified. Whether the initiating party associated with the first device is further associated with an alert tag is determined. The alert tag may include an identifying alert identifying the initiating party associated with the first device. In response to determining that the initiating party associated with the first device is associated with the alert tag, the identifying alert is provided as the event alert on a second device.

According to another aspect, a system for providing an event alert is provided. The system includes a memory and a processor functionally coupled to the memory. The memory stores a program containing code for providing the event alert. The processor is responsive to computer-executable instructions contained in the program and operative to detect an incoming communication from a first device, identify an initiating party associated with the first device, determine whether the initiating party associated with the first device is further associated with an alert tag, and in response to determining that the initiating party is associated with the alert tag, transmit the alert tag over a network to a second device. The alert tag may include an identifying alert identifying the initiating party associated with the first device. The second device may be configured to provide the identifying alert as the event alert.

According to yet another aspect, a computer-readable medium having instructions stored thereon for execution by a processor to perform a method for providing an event alert is provided. According to the method, an incoming communication from a first device is detected. An identity of a contacted party associated with a second device is received from the first device. Whether the contacted party associated with the second device is further associated with a first alert tag is determined. The first alert tag may include a first identifying alert identifying the contacted party associated with the second device. An initiating party associated with the first device is identified. Whether the initiating party associated with the first device is further associated with a second alert tag is determined. The second alert tag may include a second identifying alert identifying the initiating party associated with the first device. In response to determining that the contacted party is associated with the first alert tag and determining that the initiating party is associated with the second alert tag, the first alert tag and the second alert tag are transmitted over a network to the second device. The second device may be configured to provide the first identifying alert and the second identifying alert as the event alert.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 3 is a flow diagram illustrating a method for providing an event alert, in accordance with exemplary embodiments.

FIG. 4 is a flow diagram illustrating a method for providing an event alert, in accordance with exemplary embodiments.

DETAILED DESCRIPTION

The following detailed description is directed to methods, systems, and computer-readable media for providing an event alert. In the following detailed description, references are made to the accompanying drawings that form a part hereof, and which are shown by way of illustration specific embodiments or examples.

Figure 1:
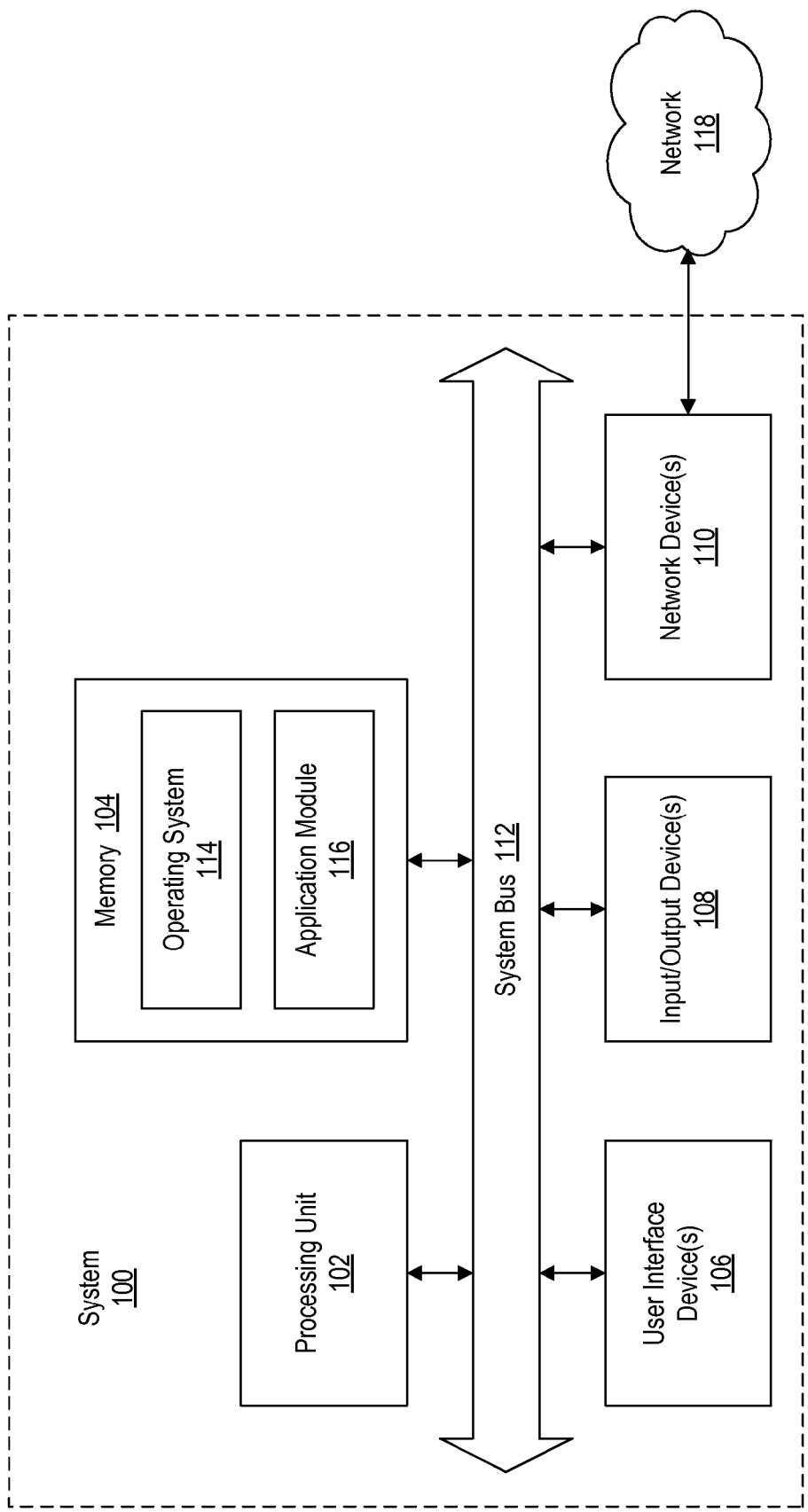
FIG. 1 is a block diagram illustrating a system configured to provide an event alert, in accordance with exemplary embodiments.

Referring now to the drawings, it is to be understood that like numerals represent like elements through the several figures, and that not all components and/or steps described and illustrated with reference to the figures are required for all embodiments. FIG. 1 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 1 is a block diagram illustrating a system 100 configured to provide an event alert, in accordance with exemplary embodiments. The system 100 includes a processing unit 102, a memory 104, one or more user interface devices 106, one or more input/output ("I/O") devices 108, and one or more network devices 110, each of which is operatively connected to a system bus 112. The bus 112 enables bi-directional communication between the processing unit 102, the memory 104, the user interface devices 106, the I/O devices 108, and the network devices 110. Examples of the system 100 include, but are not limited to, computers, servers, personal digital assistants, cellular phones, voice over Internet Protocol ("VoIP") phones, or any suitable computing devices.

The processing unit 102 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 104 communicates with the processing unit 102 via the system bus 112. In one embodiment, the memory 104 is operatively connected to a memory controller (not shown) that enables communication with the processing unit 102 via the system bus 112. The memory 104 includes an operating system 114 and an application module 116, according to exemplary embodiments. Examples of operating systems, such as the operating system 114, include, but are not limited to, WINDOWS operating system from MICROSOFT CORPORATION, LINUX operating system, and FREEBSD operating system. In one embodiment, the application module 116 is embodied in computer-readable media containing instructions that, when executed by the processing unit 102, performs a method including one or more operations. The application module 116 may include a first alert tag module 210a or a second alert tag module 210b, as described in greater detail below with respect to FIGS. 2A, 2B, 3, and 4. The application module 116 may further include an alert tag provider module 512 or an alert tag player module 516, as described in greater detail below with respect FIGS. 5, 6, and 7. According to further embodiments, the application module 116 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 100.

The user interface devices 106 may include one or more devices with which a user accesses the system 100. The user interface devices 106 may include, but are not limited to, computers, servers, personal digital assistants, cellular phones, VoIP phones, or any suitable computing devices. The I/O devices 108 enable a user to interface with the application module 116. In one embodiment, the I/O devices 108 are operatively connected to an I/O controller (not shown) that enables communication with the processing unit 102 via the system bus 112. The I/O devices 108 may include one or more input devices, such as, but not limited to, a keyboard, a mouse, or an electronic stylus. Further, the I/O devices 108 may include one or more output devices, such as, but not limited to, a display screen or a printer.

The network devices 110 enable the system 100 to communicate with other networks or remote systems via a network 118. Examples of network devices 110 may include, but are not limited to, a modem, a radio frequency ("RF") or infrared ("IR") transceiver, a telephonic interface, a bridge, a router, or a network card. The network 118 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 118 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 2A:
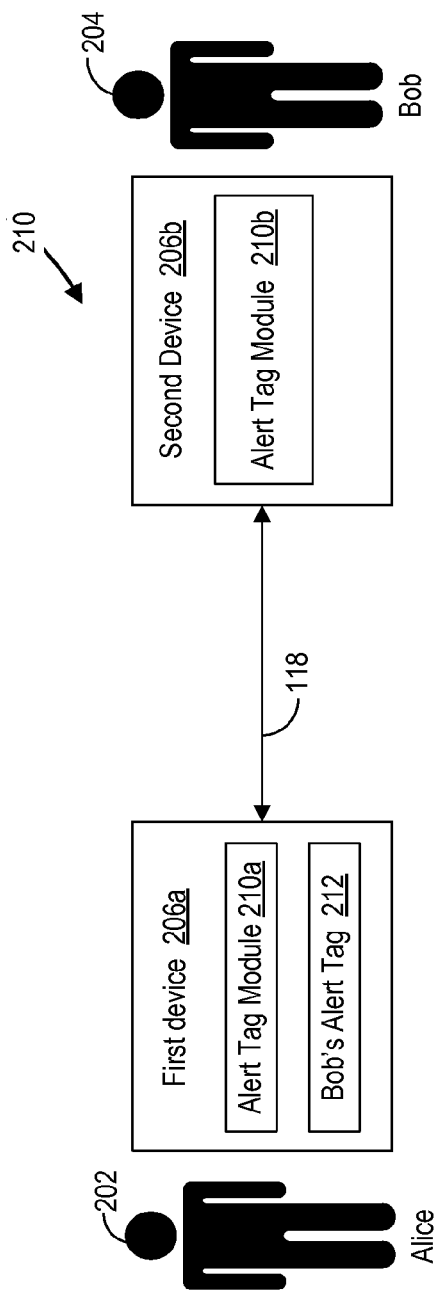
FIGS. 2A and 2B are high-level diagrams illustrating exemplary communications between two parties, in accordance with exemplary embodiments.
Figure 2B:
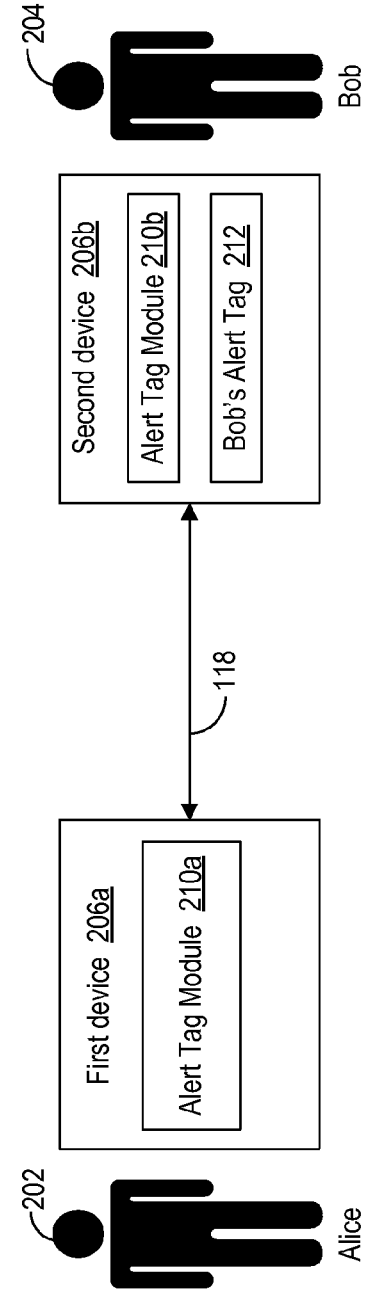

FIGS. 2A and 2B are high-level diagrams illustrating exemplary communications between two parties, Alice 202 and Bob 204, in accordance with exemplary embodiments. Alice 202 may initiate and receive communications via a first device 206a, and Bob 204 may initiate and receive communications via a second device 206b. The devices 206a, 206b may be any suitable device including, but not limited to, a cellular phone, a voice over Internet Protocol ("VoIP") phone, a computer, and other computing devices. The devices 206a, 206b may be executing any suitable application programs, such as an electronic mail ("email") client. The devices 206a, 206b may be operatively coupled via the network 118.

Referring to FIG. 2A, the first device 206a includes the first alert tag module 210a and Bob's alert tag 212, and the second device 206b includes the second alert tag module 210b. Referring to FIG. 2B, the first device 206a includes the first alert tag module 210a, and the second device 206b includes the second alert tag module 210b and Bob's alert tag 212. Referring to FIGS. 2A and 2B, the first alert tag module 210a and the second alert tag module 210b (collectively alert tag modules 210) are each illustrated as a standalone module, such as an application specific integrated circuit ("ASIC"), according to one embodiment. However, it should be appreciated that the alert tag modules 210 may be embodied in hardware, software, firmware, or any combination thereof. For example, the alert tag modules 210 may be embodied in computer-readable media containing instructions that, when executed by a processing unit, such as the processing unit 102, performs a method for providing an event alert, as described in greater detail below with respect to FIGS. 3 and 4.

In one embodiment, the alert tag modules 210 are configured to recognize an initiating party associated with an incoming communications. The incoming communications may include, but are not limited to, telephone calls and incoming email. In one example, if Bob 204 calls Alice 202, the first alert tag module 210a may recognize that an incoming call is from Bob 204, and if Alice 202 calls Bob 204, the second alert tag module 210b may recognize that the incoming call is from Alice 202. In another example, if Bob 204 emails Alice 202, the first alert tag module 210a may recognize that the incoming email is from Bob 204, and if Alice 202 emails Bob 204, the second alert tag module 210b may recognize that the incoming email is from Alice 202. The alert tag modules 210 may recognize the initiating party associated with the incoming communications via any suitable method. In one example, the alert tag modules 210 may recognize that the telephone number from where the incoming call originates is associated with Alice 202 or Bob 204. In another example, the alert tag modules 210 may recognize that header information contained in an incoming email indicates that the sender is Alice 202 or Bob 204.

In one embodiment, the alert tag modules 210 are further configured to play an alert tag, such as Bob's alert tag 212, associated with the initiating party. As used herein, an alert tag, such as Bob's alert tag 212, includes an identifying alert which uniquely identifies the initiating party. In a first embodiment, the identifying alert includes an identifying announcement that audibly identifies the initiating party. The initiating party may be identified in the identifying announcement by a name, a title, and other suitable indicators. The identifying announcement may be embodied in any suitable audio format, such as a waveform ("WAV") audio format or an MPEG-1 Audio Layer 3 ("MP3") audio format. In a second embodiment, the identifying alert includes a given arrangement of vibrations that is recognizable as identifying the initiating party. For example, the given arrangement of vibrations may be mapped to the initiating party. In a third embodiment, the identifying alert includes a picture that visually identifies the initiating party. In one embodiment, the alert tag, such as Bob's alert tag 212, may be stored in any suitable internal or external memory, such as an electrically eraseable read only memory ("EEPROM") or a subscriber identity module ("SIM") card, available on the first device 206a and the second device 206b.

FIG. 3 is a flow diagram illustrating a method 300 for providing an event alert, in accordance with exemplary embodiments. Referring to FIGS. 2A and 3, in an example, Bob 204 initiates a communication, such as a telephone call or an email message, with Alice 202. As described previously, Alice 202 may initiate and receive communications via the first device 206a, and Bob 204 may initiate and receive communications via the second device 206b. The first alert tag module 210a detects (at 302) an incoming communication from the second device 206b, and identifies (at 304) an initiating party associated with the second device 206b. In this example, the initiating party associated with the second device 206b is Bob 204.

The first alert tag module 210a determines (at 306) whether Bob 204 is further associated with an alert tag. In this example, Bob 204 is associated with Bob's alert tag 212. In one embodiment, Bob's alert tag 212 includes an identifying alert that identifies Bob 204. In one example, the identifying alert may be a prerecorded message stating "Bob." In another example, the identifying alert may be a given sequence of vibrations that identify Bob 204. In the embodiment illustrated in FIG. 2A, since Bob's alert tag 212 is stored at or near the first device 206a associated with Alice 202, the identifying alert included in Bob's alert tag 212 may be recorded, mapped, or otherwise programmed by Alice 202 or other users of the first device 206a.

In response to determining that Bob 204 is associated with Bob's alert tag 212, the first alert tag module 210a plays (at 308) the identifying alert as the event alert on the first device 206a. In one example, the first alert tag module 210a may play "Bob calling" as a call announcement. In another example, the first alert tag module 210a may play "email from Bob" as an email announcement. In yet another example, the first alert tag module 210a may play the given sequence of vibrations that indicates an incoming call from Bob 204. The identifying alert may be used to replace or supplement conventional alerts that are provided by the first device 206a. In one embodiment, the first alert tag module 210a may play an initial warning (e.g., a beep) prior to playing the identifying alert included in Bob's alert tag 212. The initial warning may be used to inform the parties at or near the first device 206a that the identifying alert is forthcoming.

Referring again to FIGS. 2A and 3, in another example, Alice 202 calls Bob 204. The second alert tag module 210b detects (at 302) an incoming communication from the first device 206a, and identifies (at 304) an initiating party associated with the first device 206a. In this example, the initiating party associated with the first device 206a is Alice 202. The second alert tag module 210b determines (at 306) whether Alice 202 is further associated with an alert tag. In this example, Alice 202 is not associated with an alert tag. In response to determining that Alice 202 is not associated with an alert tag, the method 300 ends. Because Alice 202 is not associated with an alert tag, the second alert tag module 210b may revert to a conventional alert provided by the second device 206b as the event alert.

FIG. 4 is a flow diagram illustrating a method 400 for providing an event alert, in accordance with exemplary embodiments. Referring to FIGS. 2B and 3, in an example, Bob 204 initiates a communication with Alice 202. The first alert tag module 210a detects (at 402) an incoming communication from the second device 206b and receives (at 404) an alert tag, such as Bob's alert tag 212, from the second device 206b. In one embodiment, Bob's alert tag 212 includes an identifying alert that identifies Bob 204. In one example, the identifying alert may be a prerecorded message stating "Bob." In another example, the identifying alert may be a given sequence of vibrations that identify Bob 204. Because Bob's alert tag 212 is received from the second device 206b, it may be presumed that Bob's alert tag 212 is associated with the initiating party, Bob 204. In the embodiment illustrated in FIG. 2B, since Bob's alert tag 212 is stored at or near the second device 206b associated with Bob 204, the identifying alert included in Bob's alert tag 212 may be recorded, mapped, or otherwise programmed by Bob 204 or other users of the second device 206b.

The first alert tag module 210a plays (at 406) the identifying alert as the event alert included in Bob's alert tag 212 on the first device 206a. In one example, the first alert tag module 210a may play "Bob calling" as a call announcement. In another example, the first alert tag module 210a may play "email from Bob" as an email announcement. In yet another example, the first alert tag module 210a may play the given sequence of vibrations that indicates an incoming call from Bob 204. The identifying alert may be used to replace or supplement conventional alerts provided by the first device 206a. In one embodiment, the first alert tag module 210a may play an initial warning (e.g., a beep) prior to playing the identifying alert included in Bob's alert tag 212. The initial warning may be used to inform the parties at or near the first device 206a that the identifying alert is forthcoming.

Figure 5:
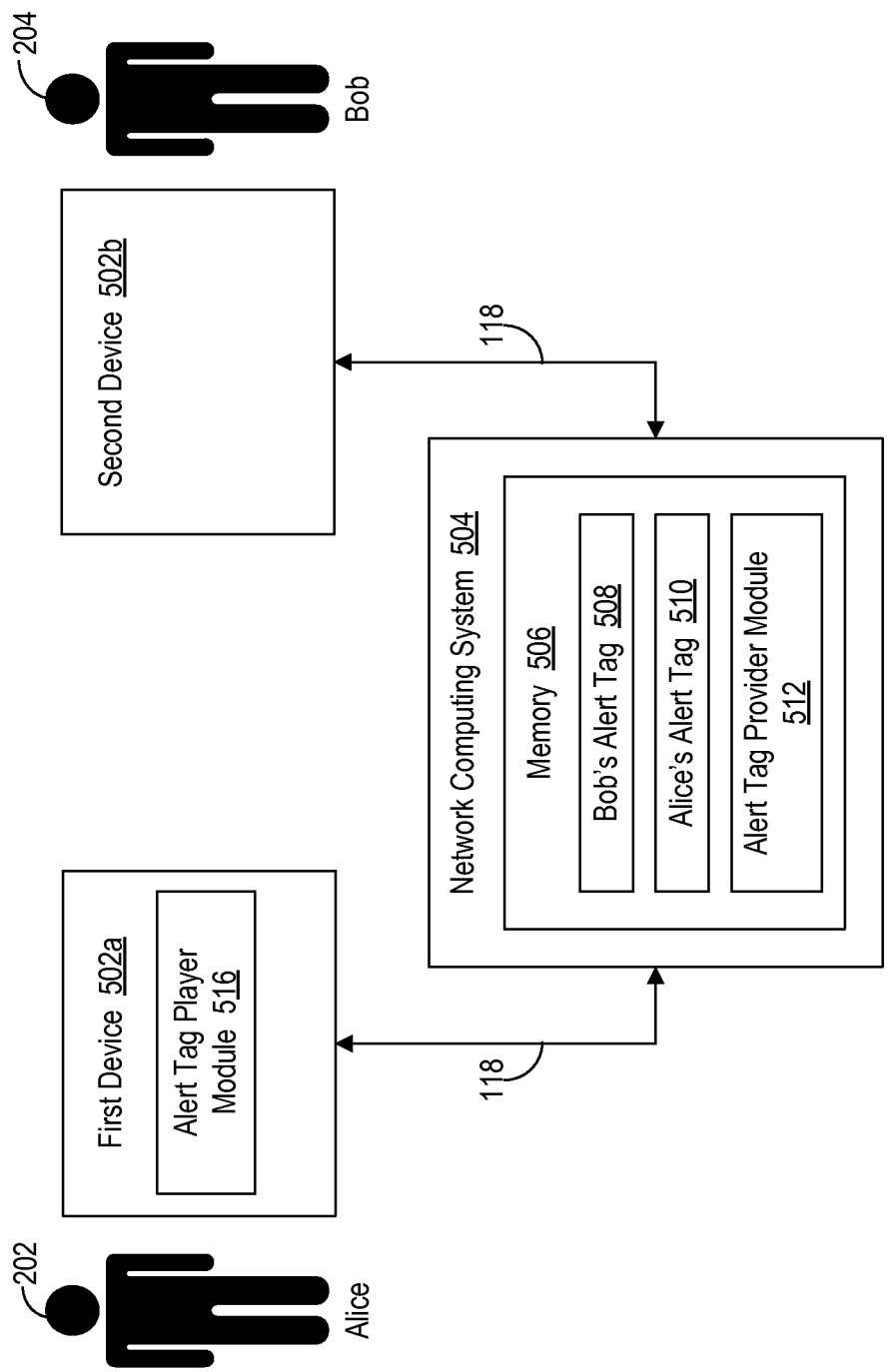
FIG. 5 is a high-level diagram illustrating exemplary network-based communications between two parties, in accordance with exemplary embodiments.

FIG. 5 is a high-level diagram illustrating exemplary network-based communications between two parties, Alice 202 and Bob 204, in accordance with exemplary embodiments. Alice 202 may initiate and receive communications via the first device 502a, and Bob 204 may initiate and receive communications via a second device 502b. The devices 502a, 502b may be any suitable device including, but not limited to, a cellular phone, a voice over Internet Protocol ("VoIP") phone, a computer, and other computing devices. The devices 502a, 502b may be executing any suitable application programs, such as an electronic mail ("email") client. The devices 502a, 502b may be operatively coupled via the network 118 and a network computing system 504.

Referring to FIG. 5, the network computing system 504 includes a memory 506, which includes Bob's alert tag 508, Alice's alert tag 510, and the alert tag provider module 512. In one embodiment, the alert tag provider module 512 is configured to provide an event alert, as described in greater detail below with respect to FIGS. 6 and 7. The first device 502a includes the alert tag player module 516, and the second device 302b does not include the alert tag player module 516. The alert tag player module 516 is illustrated as a standalone module, such as an application specific integrated circuit ("ASIC"), according to one embodiment. However, it should be appreciated that the alert tag player module 516 may be embodied in hardware, software, firmware, or any combination thereof. It should further be appreciated that Bob's alert tag 508 and Alice's alert tag 510 may be stored locally on at least one of the first device 502a or the second device 502b.

In one embodiment, access to the network computing system 504 is implemented as a network-based service. For example, Alice 202 may enter a username and password in the first device 502a. The first device 502a transmits the username and password via the network 118 to the network computing system 504, which verifies the username and password. If the username and password are verified, then the network computer system 504 may establish a session with the first device 502a. During this session, the first device 502a may be permitted access to Bob's alert tag 508 and Alice's alert tag 510. By enabling access to the network computing system 504 via the network-based service, Alice 202 may be able to access the network computing system 504 via multiple devices, as opposed to a single device, using a username and password or other security measure.

Figure 6:
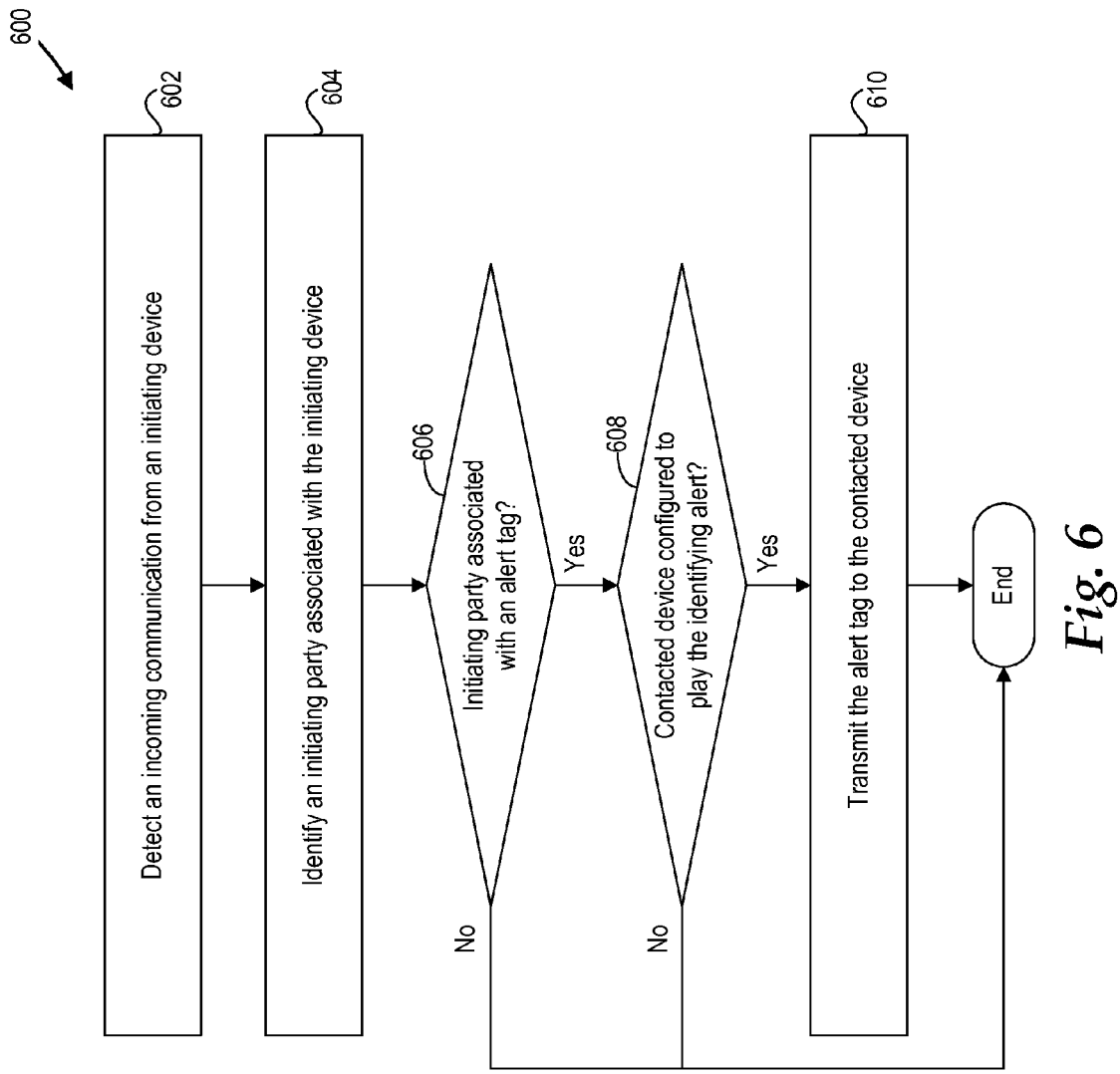
FIG. 6 is a flow diagram illustrating a method for providing an event alert, in accordance with exemplary embodiments.

FIG. 6 is a flow diagram illustrating a method 600 for providing an event alert, in accordance with exemplary embodiments. Referring to FIGS. 5 and 6, in an example, Bob 204 initiates a communication with Alice 202. As described previously, Alice 202 may initiate and receive communications via the first device 502a, and Bob 204 may initiate and receive communications via the second device 502b. The alert tag provider module 512 detects (at 602) an incoming communication from the second device 502b, and identifies (at 604) an initiating party associated with the second device 502b. In this example, the initiating party associated with the second device 502b is Bob 204.

The alert tag provider module 512 determines (at 606) whether Bob 204 is further associated with an alert tag. In this example, Bob 204 is associated with Bob's alert tag 508. In one embodiment, Bob's alert tag 508 includes an identifying alert that identifies Bob 204. In one example, the identifying alert may be a prerecorded message stating "Bob." In another example, the identifying alert may be a given sequence of vibrations that identify Bob 204. In the embodiment illustrated in FIG. 5, since Bob's alert tag 508 is stored at or near the network computing system 504, a service provider controlling the network computing system 504 can manage the creation, storage, and distribution of Bob's alert tag 508. For example, the service provider may charge Alice 202 and/or Bob 204 a fee for the creation, storage, and distribution of Bob's alert tag 508.

In response to determining that Bob 204 is not associated with an alert tag, the method 600 ends. In response to determining that Bob 204 is associated with Bob's alert tag 508, the alert tag provider module 512 determines (at 608) whether the first device 502a is configured to play the identifying alert included in Bob's alert tag 508. In one embodiment, the alert tag provider module 512 may determine whether the first device 502a is configured to play the identifying alert included in Bob's alert tag 508 by determining whether the first device 502a includes the alert tag player 516 or other means to play the identifying alert included in Bob's alert tag 508. In this example, the first device 502a includes the alert tag player 516.

In response to determining that that the first device 502a is configured to play the identifying alert included in Bob's alert tag 508, the alert tag provider 512 transmits (at 610) Bob's alert tag 508 to the first device 502a. In one embodiment, the alert tag player module 516 is configured to play the identifying alert included Bob's alert tag 508 as the event alert on the first device 502a. In one example, the alert tag player module 516 may play "Bob calling" as a call announcement. In another example, the alert tag player module 516 may play "email from Bob" as an email announcement. In yet another example, the alert tag player module 516 may play the given sequence of vibrations that indicates an incoming call from Bob 204. The identifying alert may be used to replace or supplement conventional alerts provided by the first device 502a. In one embodiment, the alert tag player module 516 may play an initial warning (e.g., a beep) prior to playing the identifying alert included in Bob's alert tag 508. The initial warning may be used to inform the parties at or near the first device 502a that the identifying alert is forthcoming.

Referring again to FIGS. 5 and 6, in another example, Alice 202 calls Bob 204. The alert tag provider module 512 detects (at 602) an incoming call from the first device 502a, and identifies (at 604) an initiating party associated with the first device 502a. In this example, the initiating party associated with the first device 502a is Alice 202. The alert tag provider module 512 determines (at 606) whether Alice 202 is further associated with an alert tag. In this example, Alice 202 is associated with Alice's alert tag 510. In one embodiment, Alice's alert tag 510 includes an identifying alert that identifies Alice 202.

In response to determining that Alice 202 is not associated with an alert tag, the method 600 ends. In response to determining that Alice 202 is associated with Alice's alert tag 510, the alert tag provider module 512 determines (at 608) whether the second device 502b is configured to play the identifying alert included in Alice's alert tag 510. In one embodiment, the alert tag provider module 512 may determine whether the second device 502b is configured to play the identifying alert included in Alice's alert tag 510 by determining whether the second device 502b includes the alert tag player 516 or other means to play the identifying alert included in Alice's alert tag 510. In this example, the second device 502b does not include the alert tag player 516. In response to determining that the second device 502b is not configured to play the identifying alert in Alice's alert tag 510, the method 600 ends. Because the second device 502b is not configured to play the identifying alert in Alice's alert tag 510, the second device 502b may revert to a conventional alert as the event alert.

Figure 7:
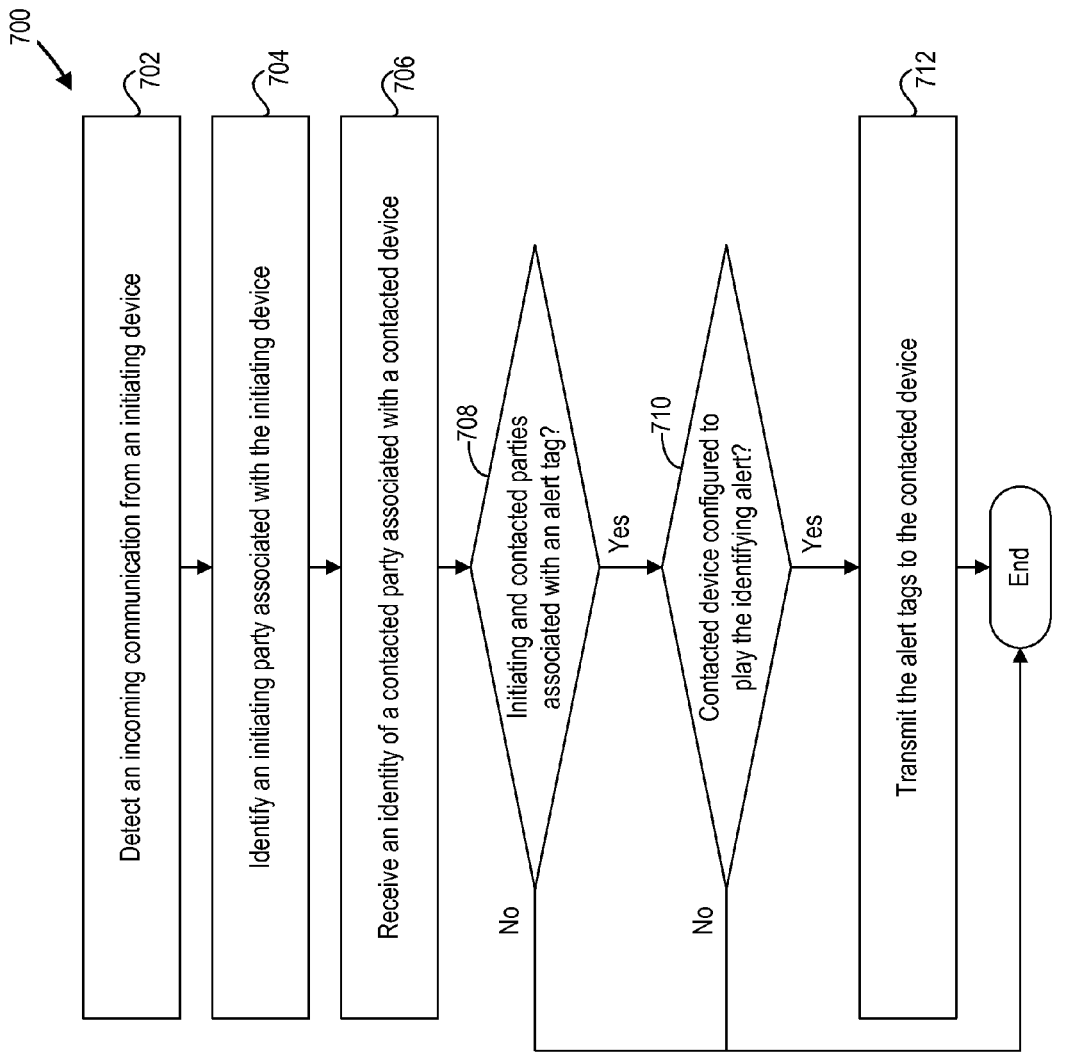
FIG. 7 is a flow diagram illustrating a method for providing an event alert, in accordance with exemplary embodiments.

FIG. 7 is a flow diagram illustrating a method 700 for providing an event alert, in accordance with exemplary embodiments. Referring to FIGS. 5 and 7, in one example, Bob 204 initiates a communication with Alice 202. The alert tag provider module 512 detects (at 702) an incoming communication from the second device 502b, and identifies (at 704) an initiating party associated with the second device 502b. In this example, the initiating party associated with the second device 502b is Bob 204. The alert tag provider module 512 receives (at 706) an identity of a contacted party associated with the first device 502a. In this example, the contacted party associated with the first device 502a is Alice 202. In one embodiment, the alert tag provider module 512 transmits to the second device 502b a plurality of parties from which to choose the contacted party.

The alert tag provider module 512 determines (at 708) whether Alice 202 and Bob 204 are each associated with an alert tag. In this example, Alice 202 is associated with Alice's alert tag 510, and Bob 204 is associated with Bob's alert tag 508. In one embodiment, Alice's alert tag 510 includes a first identifying alert that identifies Alice 202, and Bob's alert tag 508 includes a second identifying alert that identifies Bob 204. In one example, the first identifying alert may be a prerecorded message stating "Alice", and the second identifying alert may be a prerecorded message stating "Bob." In another example, the first identifying alert may be a given sequence of vibrations that identify Alice 202, and the second identifying alert may be a given sequence of vibrations that identify Bob 204.

In response to determining that Alice 202 and Bob 204 are not each associated with an alert tag, the method 700 ends. In response to determining that Alice 202 and Bob 204 are associated with Alice's alert tag 510 and Bob's alert tag 508, respectively, the alert tag provider module 512 determines (at 710) whether the first device 502a is configured to play the first identifying alert included in Alice's alert tag 510 and the second identifying alert included in Bob's alert tag 508. In one embodiment, the alert tag provider module 512 may determine whether the first device 502a is configured to play first and second identifying alerts by determining whether the first device 502a includes the alert tag player 516 or other means to play the first and second identifying alerts. In this example, the first device 502a includes the alert tag player 516.

In response to determining that the first device 502a is configured to play the first and second identifying alerts, the alert tag provider 512 transmits (at 712) Alice's alert tag 510 and Bob's alert tag 508 to the first device 502a. In one embodiment, the alert tag player module 516 is configured to play the first and second identifying alerts as the event alert on the first device 502a. In one example, the alert tag player module 516 may play "Bob calling for Alice" as a call announcement. In another example, the alert tag player module 516 may play "email from Bob for Alice" as an email announcement. In yet another example, the alert tag player module 516 may play a given sequence of vibrations that indicates an incoming call from Bob 204 for Alice 202. By enabling the first device 502a to provide information indicating the initiating party and the contacted party, the first device 502a may provide more information than conventional alerts. Such functionality may be beneficial when, for example, a number of parties share a single device, such as the first device 502a.

The first and second identifying alerts may be used to replace or supplement conventional alerts provided by the first device 502a. In one embodiment, the alert tag player module 516 may play an initial warning (e.g., a beep) prior to playing the first and second identifying alerts. The initial warning may be used to inform the parties at or near the first device 502a that the first and second identifying alerts are forthcoming.

Referring again to FIGS. 5 and 7, in another example, Alice 202 initiates a communication with Bob 204. The alert tag provider module 512 detects (at 702) an incoming communication from the first device 502a, and identifies (at 704) an initiating party associated with the first device 502a. In this example, the initiating party associated with the first device 502a is Alice 202. The alert tag provider module 512 receives (at 706) an identity of a contacted party associated with the second device 502b. In this example, the contacted party associated with the second device 502b is Bob 204.

The alert tag provider module 512 determines (at 708) whether Alice 202 and Bob 204 are each associated with an alert tag. In this example, Alice 202 is associated with Alice's alert tag 510, and Bob 204 is associated with Bob's alert tag 508. In one embodiment, Alice's alert tag 510 includes a first identifying alert that identifies Alice 202, and Bob's alert tag 508 includes a second identifying alert that identifies Bob 204.

In response to determining that Alice 202 and Bob 204 are not each associated with an alert tag, the method 700 ends. In response to determining that Alice 202 and Bob 204 are associated with Alice's alert tag 510 and Bob's alert tag 508, respectively, the alert tag provider module 512 determines (at 708) whether the second device 502b is configured to play the first and second identifying alerts. In one embodiment, the alert tag provider module 512 may determine whether the second device 502b is configured to play the first and second identifying alerts by determining whether the second device 502b includes the alert tag player 516 or other means to play the first and second identifying alerts. In this example, the second device 502b does not include the alert tag player 516. In response to determining that the second device 502b is not configured to play the first and second identifying alerts, the method 700 ends. Because the second device 502b is not configured to play the identifying alert in Alice's alert tag 510, the second device 502b may revert to a conventional alert as the event alert.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for providing an event alert, the method comprising:
   detecting, at a computing system comprising a processor, a communication from a second device to a first device;
   identifying, by the computing system, an initiating party associated with the second device;
   determining, by the computing system, whether the initiating party is associated with a first alert tag, the alert tag comprising a first identifying alert that identifies the initiating party using the second device; and responsive to determining that the initiating party is associated with the first alert tag, determining, by the computing system, whether the first device can play the first identifying alert, and in response to determining that the first device can play the first identifying alert, transmitting, by the computing system, the first alert tag associated with the initiating party to the first device.

2. The method of claim 1, wherein determining whether the first device can play the first identifying alert comprises determining whether the first device comprises an alert tag player.

3. The method of claim 1, wherein the first device plays the first identifying alert of the first alert tag as the event alert.

4. The method of claim 1, wherein, prior to the first device playing the first identifying alert of the first alert tag as the event alert, the first device plays an initial warning to inform a contacted party of the first device that the first identifying alert is forthcoming.

5. The method of claim 1, further comprising charging the initiating party with a fee associated with distributing the first alert tag.

6. The method of claim 1, further comprising:

receiving an identity of a contacted party associated with the first device communication;

determining whether the contacted party is associated with a second alert tag, the second alert tag comprising a second identifying alert that identifies the contacted party using the first device; and responsive to determining that the contacted party is associated with the second alert tag, further transmitting the second alert tag associated with the contacted party to the first device.

7. The method of claim 6 further comprising determining whether the first device is configured to play the second identifying alert.

8. A computing system for providing an event alert, the computing system comprising:

a processor; and a memory storing instructions that, when executed by the processor, cause the processor to perform operations comprising detecting a communication from a second device to a first device, identifying an initiating party associated with the second device, determining whether the initiating party is associated with a first alert tag, the first alert tag comprising a first identifying alert that identifies the initiating party using the second device, and responsive to determining that the initiating party is associated with the first alert tag, determining whether the first device can play the first identifying alert, and in response to determining that the first device can play the first identifying alert, transmitting the first alert tag associated with the initiating party to the first device.

9. The computing system of claim 8, wherein determining whether the first device can play the first identifying alert comprises determining whether the first device comprises an alert tag player.

10. The computing system of claim 8, wherein the first device plays the first identifying alert of the first alert tag as the event alert.

11. The computing system of claim 10, wherein prior to the first device playing the first identifying alert of the first alert tag as the event alert, the first device plays an initial warning to inform a contacted party of the first device that the first identifying alert is forthcoming.

12. The computing system of claim 8, wherein the memory comprises further instructions that, when executed by the processor, cause the processor to perform operations comprising charging the initiating party with a fee associated with distributing the first alert tag.

13. The computing system of claim 8, wherein the memory comprises further instructions that, when executed by the processor, cause the processor to perform operations comprising:

receiving an identity of a contacted party associated with the first device;

determining whether the contacted party is associated with a second alert tag, the second alert tag comprising a second identifying alert that identifies the contacted party using the device; and responsive to determining that the contacted party is associated with the second alert tag, further transmitting the second alert tag associated with the contacted party to the first device.

14. A non-transitory computer-readable storage medium comprising instructions that, when executed by a processor, cause the processor to perform operations comprising:

detecting a communication from a second device to a first device;

identifying an initiating party associated with the second device;

determining whether the initiating party is associated with a first alert tag, the first alert tag comprising a first identifying alert that identifies the initiating party using the second device; and responsive to determining that the initiating party is associated with the first alert tag, determining whether the first device can play the first identifying alert, and in response to determining that the first device can play the first identifying alert, transmitting the first alert tag associated with the initiating party to the first device.

15. The non-transitory computer-readable storage medium of claim 14, wherein determining whether the first device can play the first identifying alert comprises determining whether the first device comprises an alert tag player.

16. The non-transitory computer-readable storage medium of claim 14, wherein the first device plays the first identifying alert of the first alert tag as the event alert.

17. The non-transitory computer-readable storage medium of claim 14, wherein prior to the first device playing the first identifying alert of the first alert tag as the event alert, the first device plays an initial warning to inform a contacted party of the first device that the first identifying alert is forthcoming.

18. The non-transitory computer-readable storage medium of claim 14, wherein the instructions, when executed by the processor, further cause the processor to perform operations comprising charging the initiating party with a fee associated with distributing the first alert tag.

19. The non-transitory computer-readable storage medium of claim 14, wherein the instructions, when executed by the processor, further cause the processor to perform operations comprising:

receiving an identity of a contacted party associated with the first device;

determining whether the contacted party is associated with a second alert tag, the second alert tag comprising a second identifying alert that identifies the contacted party using the first device; and responsive to determining that the contacted party is associated with the second alert tag, transmitting the second alert tag associated with the contacted party to the first device.

20. The non-transitory computer-readable storage medium of claim 19, wherein the instructions, when executed by the processor, further cause the processor to perform operations comprising determining whether the first device is configured to play the second identifying alert.

* * * * *